United States Patent [19]

Mahoney et al.

[11] Patent Number: 4,698,498

[45] Date of Patent: Oct. 6, 1987

[54] THREE-DIMENSIONAL LASER IMAGING TRANSMITTER/RECEIVER

[75] Inventors: Thomas J. Mahoney; Michael Lang, both of Boulder, Colo.

[73] Assignee: Robot Defense Systems, Inc., Thornton, Colo.

[21] Appl. No.: 856,706

[22] Filed: Apr. 28, 1986

[51] Int. Cl.⁴ .............................. H01J 3/14
[52] U.S. Cl. ............................ 250/234; 250/203 R; 350/6.4
[58] Field of Search ........... 250/234, 235, 236, 203 R; 350/6.2, 6.3, 6.5, 6.6, 6.9, 6.91; 356/1, 4

[56] References Cited

U.S. PATENT DOCUMENTS

| | | | |
|---|---|---|---|
| 1,647,631 | 11/1927 | Ives | 350/6.3 |
| 3,226,721 | 12/1965 | Gould | 350/6.3 |
| 3,297,395 | 1/1967 | Dardarian | 250/203 R |
| 3,428,812 | 2/1969 | Burke | 250/203 R |
| 3,434,785 | 3/1969 | Weber | 356/1 |
| 3,552,859 | 1/1971 | Snyder, III | 356/152 |
| 4,034,949 | 7/1977 | Hoesterey et al. | 250/203 R |
| 4,061,415 | 12/1977 | Taenzer | 350/6.3 |
| 4,355,904 | 10/1982 | Balasubramanian | 356/4 |
| 4,470,698 | 9/1984 | Green, Jr. et al. | 250/231 SE |
| 4,515,447 | 5/1985 | Weimer et al. | 350/6.4 |
| 4,648,712 | 3/1987 | Brenholdt | 250/559 |

OTHER PUBLICATIONS

"Three-Dimensional Vision System for the Adaptive Suspension Vehicle", David M. Zuk and Mark L. Dell-'Eva, Jan., 1983.

Primary Examiner—David C. Nelms
Assistant Examiner—Chung Seo
Attorney, Agent, or Firm—Sheridan, Ross & McIntosh

[57] ABSTRACT

Apparatus and method are disclosed for transmitting modulated, collimated light and receiving reflected light that is used in providing a three-dimensional display of a field being viewed. The apparatus includes a pair of counter-rotating optical wedges in both the transmitter and receiver sections of the apparatus. An elevation mirror communicates with both the light transmitted to and the light reflected by objects in the field of view. The counter-rotating wedges and the elevation mirror cooperate to provide a raster scan of the field of view using the transmitted light beam. The reflected light communicates with further optical and electronic hardware for subsequent filtering and processing. Each of the four optical wedges is rotated using a secondary gear, with each secondary gear on the transmitter section being aligned with a secondary gear on the receiver section of the apparatus. Each of the aligned secondary gears is driven by the same primary gear. Each of the two primary gears is aligned along a common axis of rotation, but with the primary gears rotating in opposite directions. The transmitter/receiver apparatus cooperates with the accompanying hardware to detect and display objects found in the field of view and also provides an indication as to the distance a displayed object is located from the transmitter/receiver apparatus.

29 Claims, 6 Drawing Figures

THREE-DIMENSIONAL LASER IMAGING TRANSMITTER/RECEIVER

FIELD OF THE INVENTION

The present invention relates to an apparatus for transmitting and receiving light energy for use in providing a three-dimensional representation of a scanned area.

BACKGROUND INFORMATION

In connection with the monitoring of a desired area, it is frequently important to be able to accurately detect intruders and other objects with a relatively high degree of resolution. Two-dimensional systems that include video cameras, for example, have been commonly used for monitoring and intrusion detection purposes. However, such systems have certain deficiencies including the inability to see at night and the inability to immediately distinguish an intrusion from safe or normal conditions. Such systems also cannot provide information concerning the distance an object is located from a reference location.

One known system has been proposed for overcoming such deficiencies. In the publication entitled "Three-Dimensional Vision System for the Adaptive Suspension Vehicle" of Zuk et al. published January, 1983 and sponsored by Defense Advance Research Projects Agency of the Department of Defense, a three-dimensional imaging system is described. This system is intended to provide a three-dimensional image of a scanned area using light outputted by a laser source. Scanning horizontally is achieved using a multi-sided or polygon mirror and a folding mirror. Scanning in the vertical direction is accomplished by means of a nodding mirror. Even though this scanning mechanism may function adequately in an experimental or testing environment, its large and relatively cumbersome size renders it unacceptable for certain, desired applications.

With regard to other previously devised scanning techniques, it is well-known to utilize counter-rotating optical wedges or prisms in order to obtain a horizontal scan of a scene that is being viewed. In U.S. Pat. No. 1,647,631 to Ives entitled "Optical System", an optical system is disclosed in which two sets of optical wedges are employed. One set of counter-rotating wedges produces a scan in a horizontal direction while the second set of counter-rotating wedges produces a scan in a vertical direction. Similar in significant respects to the apparatus disclosed in the Ives patent, is the optical system disclosed in U.S. Pat. No. 3,226,721 to Gould and entitled "Scanning Antenna Utilizing Four Rotary Prisms to Produce Rectilinear Scan and Fifth Prism to Produce Conical Scan." Two sets of pairs of counter-rotating wedges are utilized. Such wedges are rotated by means of a gear assembly driven by a motor. The scanning mechanisms disclosed in these two patents do not describe the hardware that is employed for receiving the light energy returned from the scanned area. In another known optical system that does not utilize scanning techniques, a system is disclosed for comparing the position of an object with that of a reference object. In U.S. Pat. No. 3,552,859 to Snyder III and entitled "Optical Instrument for Determining the Parallelism or Nonparallelism of Two Reflecting Surfaces," a system is illustrated that uses a pair of interconnected dual beam modulators, each of which transmits and receives light signals or information for comparison purposes.

Such prior art systems, however, have failed to satisfy the competing needs that arise in the development of a three-dimensional imaging system. Unlike other known systems, the present invention provides a relatively compact and efficient transmitter/receiver unit for rapidly raster scanning changing scenes with considerable accuracy and resolution.

SUMMARY OF THE INVENTION

A transmitter/receiver apparatus is disclosed for obtaining information used in displaying a three-dimensional visual representation of a viewed scene. The apparatus includes transmitting and receiving sections and can be mounted to an assembly that moves, or mounted on a movable vehicle, so that the same or different scenes can be continuously viewed and updated. In a preferred embodiment, the apparatus has a field of view of about 45°×30° to a distance of about 140 feet. The transmitter/receiver apparatus is integrated with other hardware for immediately providing the three-dimensional image of the viewed scene. Because the visual representation is a three-dimensional image, not only is a visual representation of objects found in the viewed area shown, but the display also provides an indication as to the distance each of such objects are located away from the transmitter/receiver apparatus.

The apparatus includes a housing that contains the parts or elements used in transmitting and receiving light information. The transmitting section includes a light source that is sent to the field of view or the area being scanned. Preferably, the light source comprises a laser diode that is current driven by a modulated laser driver. The output light beam from the laser diode is collimated by a transmit lens system and the collimated light passes to a transmit set of counter-rotating optical wedges or prisms. The modulated, collimated light passes through the wedges, with the counter-rotation thereof causing the light beam to move or scan in a first or horizontal direction between a first or left edge and a second or right edge of the field of view. Each of the two transmit wedges is supported in a wedge holder that is rotated using a secondary gear. Each of the two secondary gears operatively meshes with a primary gear. Both of the primary gears are driven by a primary gear motor through a bevel gear assembly. The scanning light beam outputted by the pair of transmit wedges is received by an elevation mirror. The elevation mirror directs the light beam to the scene or area being viewed by the apparatus. The elevation mirror pivots about a substantially horizontal shaft and is driven by a motor operably connected to the shaft. Movement of the elevation mirror relative to the horizontal shaft causes a change in the position of the light beam in a vertical direction to thereby effect vertically scanning by the light beam.

During the raster scanning, the light beam is reflected by objects in its path and the reflected light is received by the same elevation mirror. The reflected light passes from the elevation mirror to the receiving section, which includes a second set of counter-rotating optical wedges, each of which is supported by a wedge holder. Each of these two wedge holders is caused to rotate by one of the same secondary gears that is used in rotating one of the transmit wedges. Each of these two secondary gears is also driven by one of the two primary gears that mesh with the secondary gears disposed on the transmitting section of the apparatus. Each of the two primary gears has an axis of rotation. The axes of rotation of the primary gears are preferably aligned. Similarly, each of the two secondary gears on the transmit side of the apparatus has an axis of rotation aligned with the axis of rotation of the other secondary gear. Likewise, the secondary gears on the receive side of the apparatus have aligned axes of rotation. The axes of rotation of the secondary gears are symmetrically located relative to the aligned axes of rotation of the primary gears. The light from the two counter-rotating receive wedges passes to a receive lens system for proper focusing of the received light.

As the wedge pairs on the transmitting and receiving sections of the apparatus continue to rotate, together with the pivoting movement of the elevation mirror, a raster scan of the entire field of view is achieved. In a preferred embodiment, during the horizontal scan, a pixel or data point is taken at 0.2° intervals resulting in about 256 pixels for each horizontal scan. In connection with determining the end of a horizontal scan, a timing slit is formed in an outer face of one of the two secondary gears located on the receiving section of the apparatus. A pair of sensor devices, located 180° apart, are used in detecting when the timing slit passes next to the sensor device. When the timing slit is detected, it is an indication that the end of a horizontal scan has been reached. At the completion of each horizontal scan, the position of the elevation mirror is adjusted so that successive horizontal scans can be made. Once the entire field of view is scanned by the light beam, the scanning process is repeated so that the three-dimensional image is updated.

Subsequent to the focusing of the received light, processing of this information-containing light is performed. In particular, a visual display of each of the scanned sections found in the field of view is provided. From the display, a visual representation of objects in the field of view can be seen, as well as an indication of the distance each of the objects is located from the transmitter/receiver apparatus.

In view of the foregoing summary, a number of desired objectives are seen to be satisfied by the present invention. A compact, and yet highly efficient and effective, transmitting/receiving apparatus is disclosed for use in providing a three-dimensional image of a scanned area. The apparatus, together with accompanying hardware, enables accurate visual representations of scenes to be displayed. A relatively large field of view is achieved while, at the same time, a high degree of accuracy and resolution are maintained. Accordingly, a display of the scene including intrusive objects can be provided immediately and, in the case of an intruder, the exact location, shape and direction of any movement of the intruder is provided on a visual display communicating with the transmitter/receiver apparatus.

Additional advantages of the present invention will become readily apparent from the following discussion when taken in conjunction with the accompanying drawings.

DETAILED DESCRIPTION

In accordance with the present invention, a transceiver apparatus is disclosed for transmitting and receiving information-containing light energy for use in providing a three-dimensional visual display of objects found in a field or scene being viewed by the apparatus. The transceiver has a relatively compact size so that it can be transported whereby different scenes can be viewed by moving the transceiver apparatus. In a preferred embodiment, the field of view of the transceiver encompasses a field or scene of about 45° in a generally horizontal direction and about 30° in a generally vertical direction, and is able to identify objects that are within a distance of about 140 feet from the transceiver.

Figure 1A:
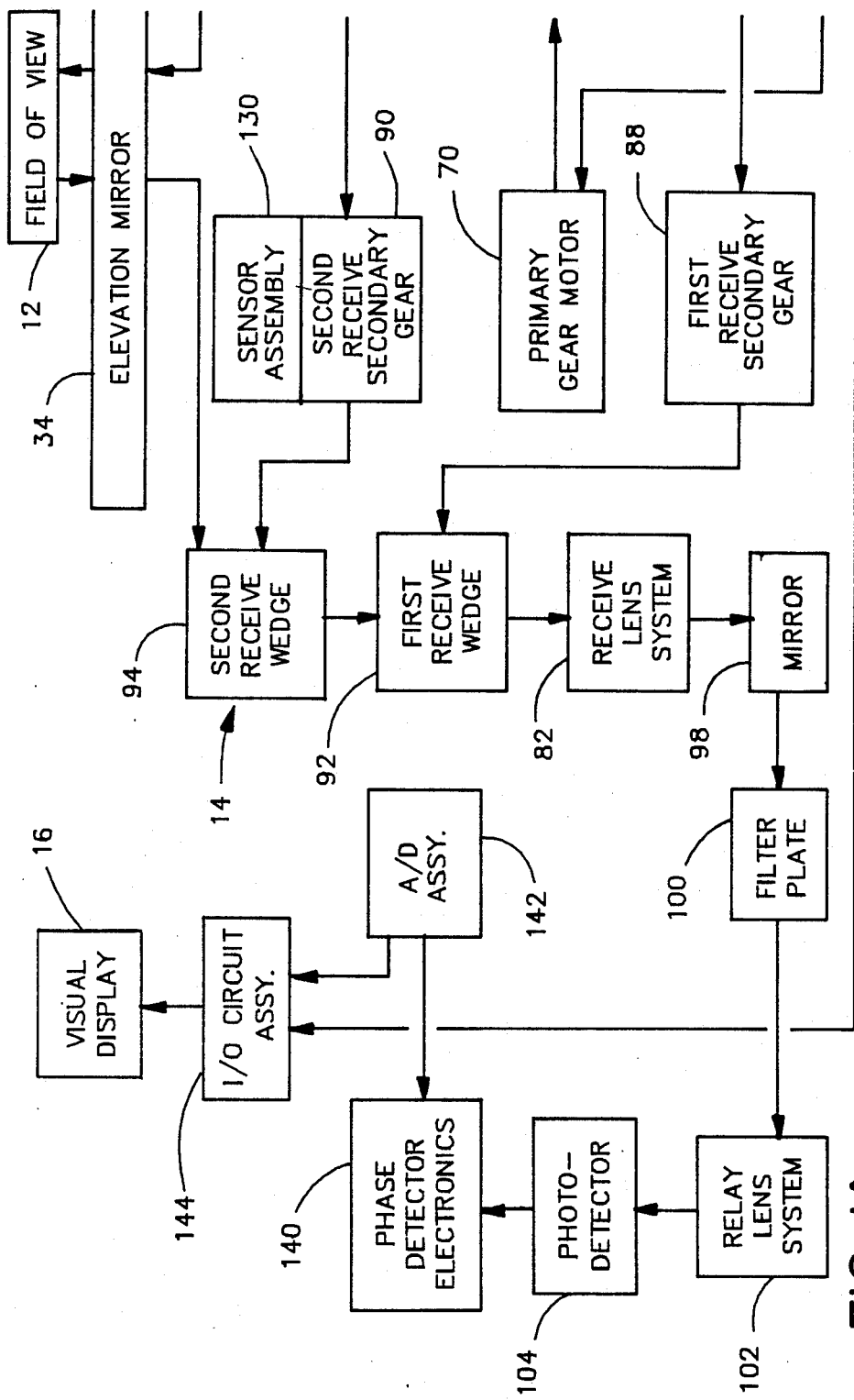
FIGS. 1A-1B are a block diagram of major components of the transmitter/receiver apparatus as well as cooperating hardware used in providing a three-dimensional image of the field of view.
Figure 1B:
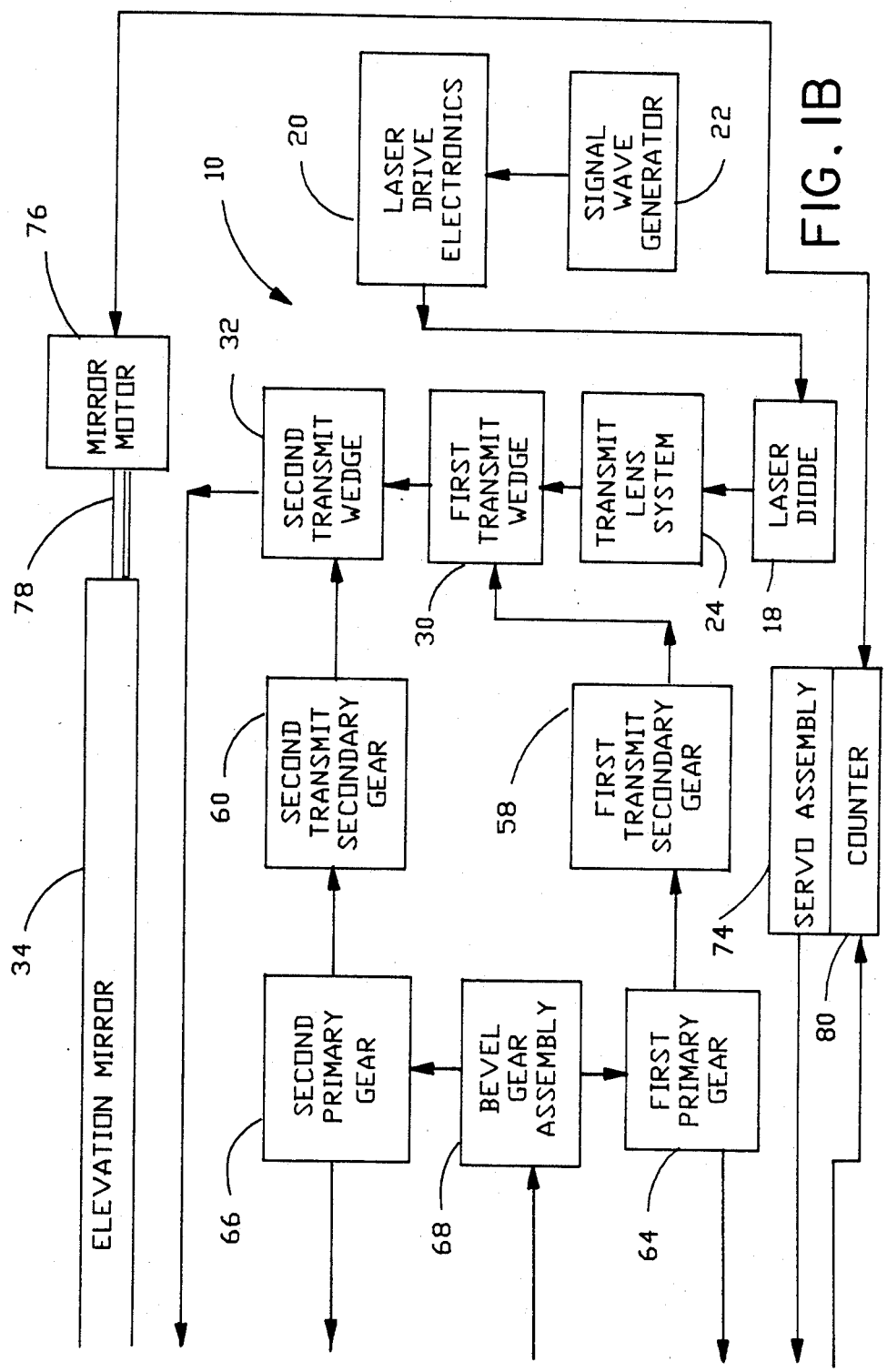

With reference to the block diagram of FIGS. 1A-1B, the transceiver includes a transmitter section 10 for sending light energy to the area being viewed. Light intelligence is reflected by objects found in the field of view 12 and returned to a receiver section 14. The returned light energy is processed to produce a graphics display of the viewed scene 12 using a visual display 16. This graphics display corresponds to a three-dimensional image of the field of view 12 in which objects therein can be seen and their distances from the transceiver are visually portrayed using the visual display 16.

The transmitter section 10 includes a laser assembly for generating modulated light energy. The laser assembly includes a conventional laser diode 18, which is current driven by laser drive electronics 20. In one embodiment, the laser drive electronics 20 includes a transformer coupled transimpedance power amplifier with an open collector output for current driving a 2 volt 100 milliwatt laser diode. The laser assembly also includes a signal wave generator 22 that generates a 3.5 MHz amplitude modulated signal. The modulating signal from the signal wave generator 22 is applied to the laser drive electronics 20 so that the current drive produced by the laser drive electronics is modulated at 3.5 MHz in normal system operation. The diverging light energy generated by the laser diode 18 is thereby amplitude modulated.

The transmitter section 10 also includes a transmit lens system 24 that communicates with the output of the laser diode 18. The lens system 24 acts to transform the diverging light energy from the laser diode 18 to a collimated light beam for subsequent transmission to the scene being viewed. As best seen seen in FIG. 3, the transmit lens system 24 includes, in one embodiment, a number of lenses 26, which are axially aligned and located next to each other in a vertical direction. It should be understood, however, that differently configured lens systems could be employed for the purpose of collimating the divergent light energy outputted by the laser diode 18.

Figure 3:
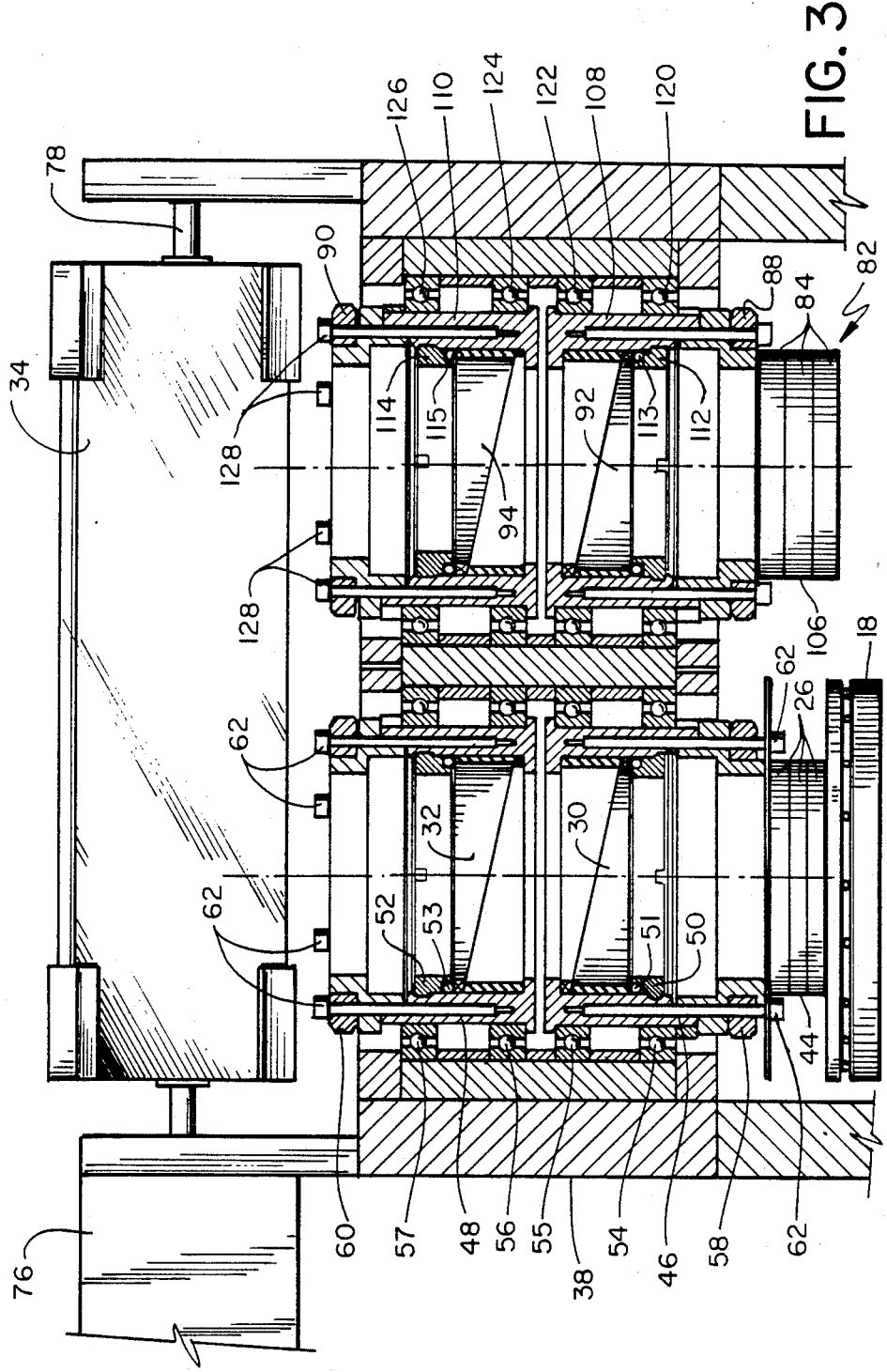
FIG. 3 is a rear sectional view, taken along lines 4—4 of FIG. 2, showing the transmit and receive counter-rotating wedge pairs and lens systems.

The transmitter section 10 further comprises a horizontal scanning assembly having a pair of counter-rotating optical wedges or prisms. As can be seen in FIG. 3, the wedge pair includes a first transmit wedge 30 and a second transmit wedge 32. Each of the two wedges 30, 32 is rotatable about a vertical axis located substantially through the centers of each of the two wedges 30, 32. As is well known, rotation of the two wedges 30, 32 in opposite directions for 180° produces a movement of or scan by the light beam in a horizontal direction from a first or left end to a second or right end of the field being viewed. Continued rotation of the wedges 30, 32 in opposite directions for the next 180° causes the light beam provided to the wedges 30, 32 to be moved from the second end to the first end. By repeated counter-rotation of the wedges 30, 32, scans in the horizontal direction are made.

Figure 2:
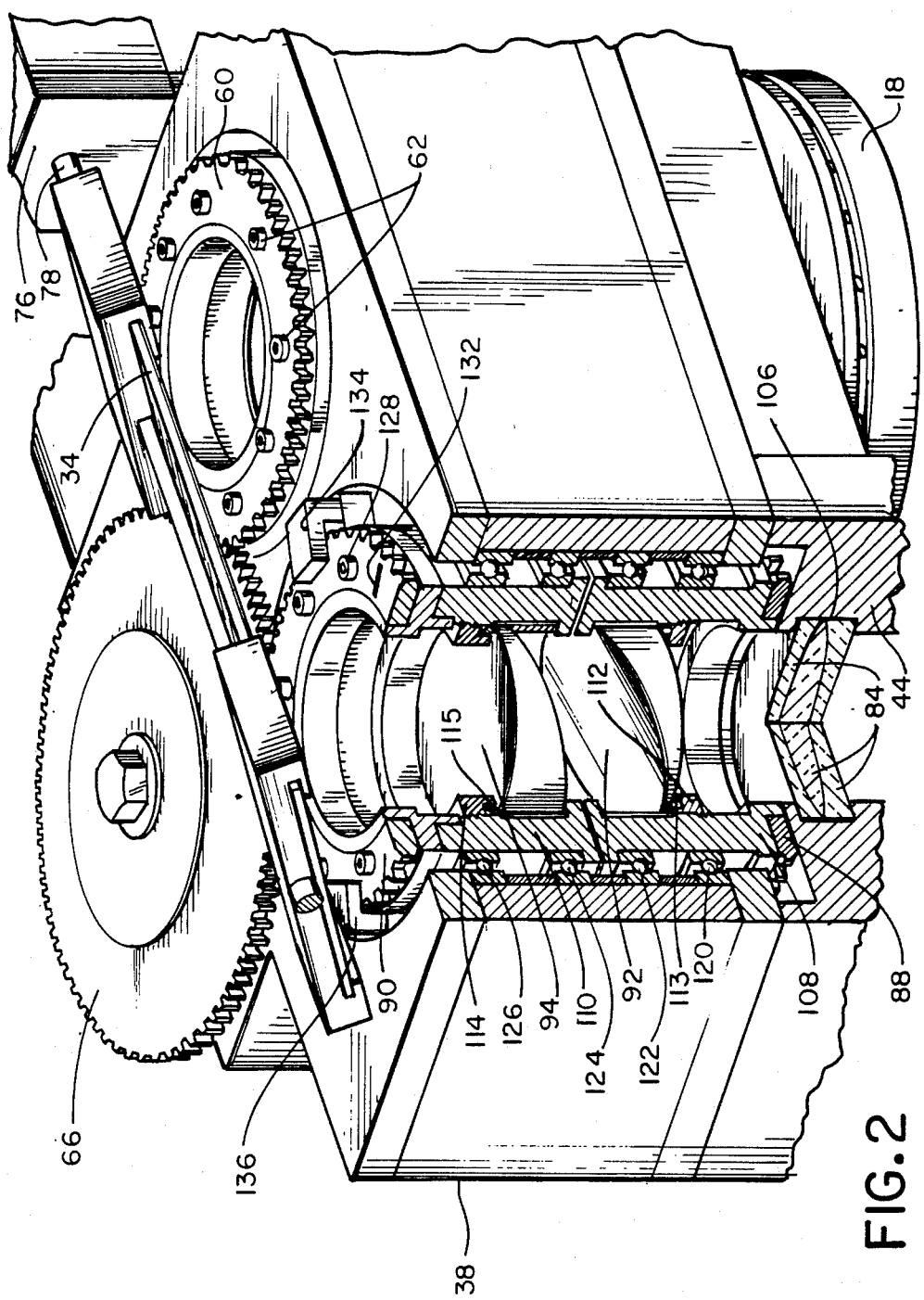
FIG. 2 is a front perspective view of the transmitter/receiver apparatus with sections thereof cut away showing transmitter and receiver elements positioned within the casing.

To produce movement of the light beam in a vertical direction, a vertical scanning assembly is utilized and includes an elevation mirror 34 that is positioned to receive and direct the modulated, collimated light beam that passes through the transmit wedge pair. With reference to FIG. 2, the elevation mirror 34 is pivotal about a substantially horizontal axis in order to change the vertical position of the light beam and thereby accomplish vertical scanning of the light beam, which is directed at the field of view 12.

Figure 4:
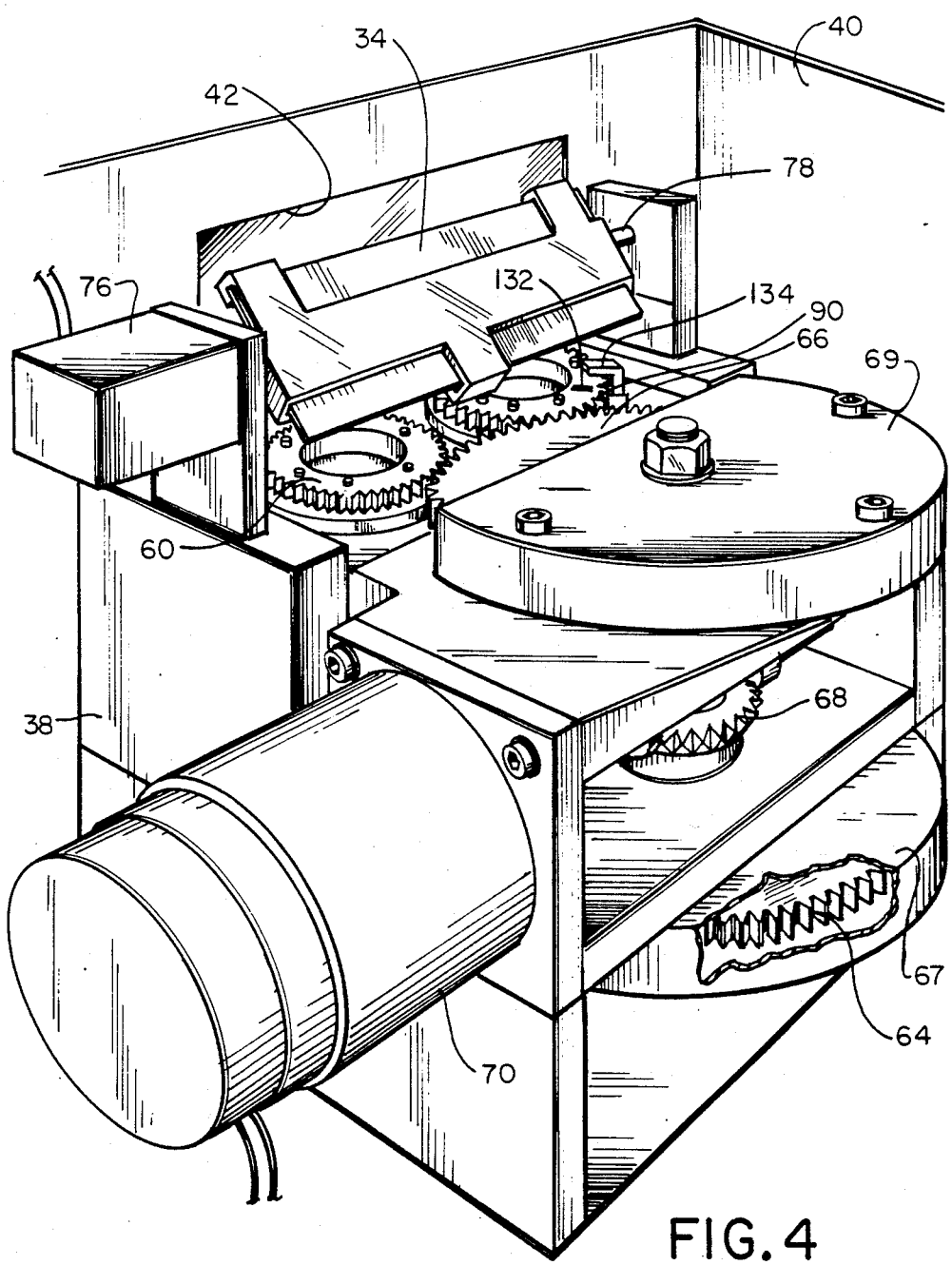
FIG. 4 is a rear perspective view of the transmitter/receiver apparatus showing the primary gear for interconnecting the transmitter and receiver sections of the apparatus.

To realize a compact transceiver unit, the transmitter elements are uniquely configured and arranged, as seen in FIGS. 2-5. In particular, the transmitter elements of the present invention are supported in a casing 38, which is substantially rectangular in shape and has a number of walls. As illustrated in FIG. 4, the casing 38 is contained within a housing 40 having a window 42 through which the light beam is transmitted and the reflected light is received. With respect to the transmitter section 10 and FIG. 3 particularly, a cylindrical bore is formed through the casing 38. At the bottom end of this bore, the laser diode 18 is positioned. Adjacent to the laser diode 18 a lens enclosure or housing unit 44 is fixedly positioned. The lens enclosure 44 is generally cylindrical in shape and includes recesses or slots for receiving and holding peripheral portions of the lenses 26. Also positioned within the bore are wedge holders 46, 48. The wedge holder 46 is positioned adjacent to the lens enclosure 44 and is vertically aligned therewith. A metal ring 50 is located inwardly of the holder 46 and, together with its accompanying O-ring 51, are used in firmly holding the wedge 30 in the wedge holder 46. The wedge holder 48 is vertically aligned with the wedge holder 46. A metal ring 52 is located inwardly of the holder 48 and, together with its accompanying O-ring 53, assist in fixedly maintaining the position of the wedge 32 in the wedge holder 48. Both of the wedge holders 46, 48 include circumferential recessed portions for receiving peripheral parts of the wedges 30, 32, respectively. Because of the wedge-like shapes of the optical wedges 30, 32, the recessed portions vary in height to accommodate the wedges. To facilitate rotation of the wedge holders 46, 48, together with the accompanying wedges 30, 32, bearings are employed between the walls of the casing 40 and the outer surface of the holders 46, 48. For holder 46, bearings 54, 55 are provided at opposite ends of the holder 46. With regard to holder 48, bearings 56, 57 are provided at opposite ends thereof.

Counter-rotation of the wedges 30, 32, together with their respective holders 46, 48, is achieved using secondary gears 58, 60. A first transmit secondary gear 58 is connected to the outer surface of the holder 46 while a second transmit secondary gear 60 is connected to the outer surface of the holder 48. As best seen in FIG. 3, the secondary gears 58, 60 are connected to the holders 46, 48, respectively, by means of elongated pins 62 that are received in aligned bores formed in the secondary gears 58, 60 and the holders 46, 48, respectively. As a consequence, rotational movement of the secondary gears 58, 60 results in rotational movement of the wedges 30, 32.

Figure 5:
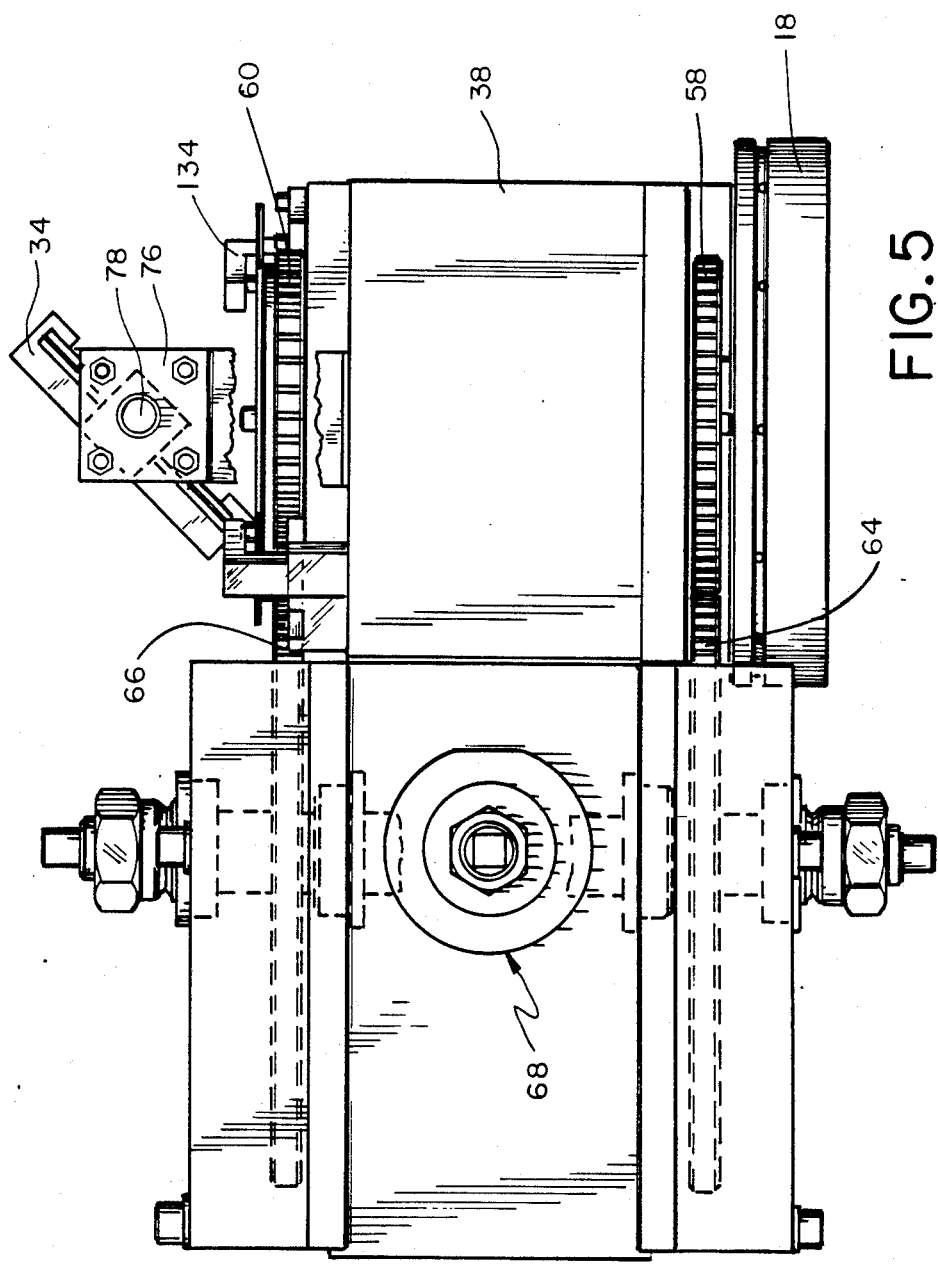
FIG. 5 is a side elevational view of the transmitter/receiver apparatus.

In conjunction with causing the rotational movement of the secondary gears 58, 60, a pair of primary gears 64, 66 are utilized, each of which meshingly enages with one of the transmit secondary gears 58, 60. The teeth of a first primary gear 64 engages the teeth of the secondary gear 58, as illustrated in FIG. 5. The teeth of a second primary gear 66 meshes with the teeth of the secondary gear 60, as illustrated in FIG. 4. Each of the two primary gears 64, 66 is covered by a protective housing 67, 69, respectively. The first primary gear 64 and the second primary gear 66 are spaced from each other in a vertical direction with the first primary gear 64 located adjacent to the bottom of the casing 38 while the second primary gear 66 is located adjacent to the top of the casing 38. Each of the two primary gears 64, 66 has an axis of rotation, with the axis of rotation of the first primary gear 64 being aligned with the axis of rotation of the second primary gear 66. The two primary gears 64, 66 are interconnected by a conventional bevel gear assembly 68. The bevel gear assembly 68 is powered by a primary gear motor 70. When the bevel gear assembly 68 is driven by the primary gear motor 70, it causes each of the primary gears 64, 66 to rotate about its respective axis of rotation in a direction opposite that of the other primary gear. The counter-rotation of the primary gears 64, 66 is transmitted to the secondary gears 58, 60, respectively, so that the wedges 30, 32 are also rotated in opposite directions. In a preferred embodiment, the wedges 30, 32 rotate at a very high speed of about 5,280 rpm through a 2:1 gear ratio thereby requiring a primary gear motor velocity of 2,640 rpm. The power required to drive the primary gears is only about 4.5 amps at about 24 volts.

The speed of the primary gear motor 70 is maintained using a servo assembly 74 that is electrically connected to the primary gear motor 70. In one embodiment, the servo assembly 74 commands torque into the primary gear motor 70 as a function of the frequency difference between an optical shaft encoder and a reference signal. The shaft encoder is connected to the primary gear motor 70. The servo assembly 74 also communicates with an elevation mirror motor 76. The output of the mirror motor 76 is applied to a shaft 78, which is operably connected to the elevation mirror 34. When power is applied to the mirror motor 76, the shaft 78 turns causing the elevation mirror 34 to pivot about the axis of the shaft 78, which extends substantially horizontally. The servo assembly 74 includes a counter 80 for use in determining the position of the elevation mirror 34 and determining when the vertical scan has reached its outer limits so that the counter 80 can be reset and the elevation mirror 34 can be positioned to repeat the vertical scanning process, as will be discussed in more detail in connection with the operation of the invention.

With regard to the receiver side 14 of the transceiver apparatus and particularly FIGS. 1A-1B and 2, it includes a receive lens system 82 having a number of lenses 84, and secondary gears 88, 90 for use in causing rotation of counter-rotating wedges 92, 94 of a receive wedge pair. As illustrated in block form in FIG. 1A, unlike the transmitter section 10, the receiver section 14 includes relay optics for changing the direction of the returned light. The direction of the returned light is changed so that the casing 38 remains compact in size. The relay optics includes a mirror 98 to which the reflected light from the field of view is directed by the lens system 82. The mirror 98 is preferably at an angle of about 45° relative to the axis of the light beam emitted from the lens system 82. The mirror 98 directs the light beam at an angle of 90° relative to the axis of the light beam as it is emitted from the lens system 82. The mirror 98 is essentially laterally aligned with the laser diode 18.

Before converting the reflected light energy to an electrical signal for processing, the light beam reflected by the mirror 98 is sent to a filter plate 100 having an optical slit for use in filtering unwanted light from the reflected light received from the field of view 12. That is, the reflected light, which passes from the mirror 98, passes through the optical slit formed in the filter plate 100. Other light present in the transmitter/receiver apparatus from extraneous sources does not pass through the optical slit thereby removing or filtering unwanted light. The filtered light is then sent to a relay lens system 102 for desired focusing of the filtered light before it is applied to a photodetector 104. The photodetector 104 converts the light energy to electrical signals for subsequent processing in providing a three-dimensional visual display.

Referring now to FIGS. 2-4, the arrangement of the receiver elements of the transceiver apparatus will be discussed in greater detail. As can be seen in FIGS. 2 and 3, the receiver lens system 82 and the counter-rotating wedge pair are identical to the lens system 24 and wedge pair, respectively, of the transmitter section 10. The lenses 84 are laterally aligned or in substantially the same plane as the corresponding lenses 26. The same is true of the counter-rotating wedges 92, 94, which are laterally aligned with or substantially lie in the same plane as the wedges 30, 32, respectively. As illustrated in FIG. 3, the lenses 84 are held in a lens enclosure 106 that is positioned at the bottom of a second cylindrical bore formed in the casing 38. Each of the lenses 84 is held in a slot formed in the enclosure 106. Like the counter-rotating wedges 30, 32, the wedges 92, 94 are held in generally cylindrical-shaped wedge holders 108, 110, respectively. The wedge holder 108 is positioned vertically between the lens enclosure 106 and the wedge holder 110. Like the transmitter section 10, a metal ring 112, together with an accompanying O-ring 113, are located adjacent to an inner surface of the wedge holder 108 while a metal ring 114, together with an accompanying O-ring 115, are located adjacent to an inner surface of the wedge holder 110. To facilitate rotation of the holders 108, 110, together with their accompanying optical wedges 92, 94, a number of bearings are positioned between the outside surface of the holders 108, 110 and the inner surface of walls of the casing 38. Specifically, bearings 120, 122 are positioned between the inner surface of the wall of the casing 38 and the wedge holder 108 while the bearings 124, 126 are positioned between the casing 38 wall and the wedge holder 110.

With regard to each of the two receive secondary gears 88, 90, they are also laterally aligned with or lie in substantially the same plane as transmit secondary gears 58, 60, respectively. The first receive secondary gear 88 is fixedly attached to the wedge holder 108 using a number of pins 128 that are received and held in aligned bores formed in the secondary gear 88 and the wedge holder 108. Likewise, pins 128 are utilized to fixedly attach the second receive secondary gear 90 to the wedge holder 110. The first receive secondary gear 88 meshes with the first primary gear 64 while the second receive secondary gear 90 meshes with the second primary gear 66. In view of this configuration, it is seen that, like the counter-rotating wedges 30, 32, the wedges 92, 94 have a common axis of rotation, which is located through the wedge centers. Additionally, the common axis of rotation of the wedges 92, 94 and the common axis of rotation of the wedges 30, 32 are symmetrically located with respect to the axes of rotation of the primary gears 64, 66. That is, the common axis of rotation of the wedges 30, 32 is the same distance from the axis of rotation of the primary gears 64, 66 as is the common axis of rotation of the wedges 92, 94. Symmetry is also found in relation to the elevation mirror 34. The elevation mirror 34 is centered relative to the axes of rotation of the wedges on the transmitter and receiver sections of the apparatus so that the distance from the axis of rotation of the wedges 30, 32 of the transmitter section 10 to the center of the elevation mirror 34 is the same as the distance from the axis of rotation of the wedges 92, 94 of the receiver section 14 to the center of the elevation mirror 34.

In connection with determining the end of a horizontal scan, the receiver section 14 also includes a sensor assembly 130 comprised of a timing slit 132 and two identical sensor devices 134, 136. The timing slit 132 is a narrow aperture formed through the thickness of the second receive secondary gear 90, as illustrated in FIG. 2. The sensor devices 134, 136 are connected adjacent to the secondary gear 90 and are positioned 180° from each other. During rotation of the secondary gear 90, each of the sensor devices 134, 136 senses when the timing slit 132 passes below or in alignment with the devices 134, 136. When the timing slit 132 is aligned with one of the two sensor devices 134, 136, an indication is provided that the horizontal scan has reached either its left or right end and the horizontal scan must change direction.

In assembling the transmitter and receiver elements, it is important that they be properly aligned. In that regard, in the preferred embodiment, scribe marks are utilized to insure alignment and a proper working relationship among the various parts. In particular, each of the holders 46, 48, and 108, 110 is marked with a pair of scribe lines, each being 180° apart from the other line. Each of the wedges 30, 32, and 92, 94 each has a pair of scribe lines with one line denoting the maximum thickness of the wedge while the other line denoting the minimum edge thickness. The secondary gears 58, 60, and 88, 90 also include vertical lines to facilitate proper alignment of the gears and the wedges 30, 32, and 92, 94.

During operation of the transmitter/receiver apparatus, power applied to the primary gear motor 70 causes the primary gears 64, 66 to rotate in opposite directions by means of the bevel gear assembly 68. Because of the meshing engagement between the first primary gear 64 and the first transmit secondary gear 58 and the first receive secondary gear 88, the secondary gears 58, 88 both rotate in a direction opposite to that of the first primary gear 64. Because the second primary gear 66 rotates in a direction opposite that of the first primary gear 64, the second transmit secondary gear 60 and the second receive secondary gear 90 both rotate in the same direction, but opposite to that of the secondary gears 58, 88. Since the wedges 30, 92 are operatively connected to the secondary gears 58, 88, respectively, they will rotate in a direction opposite that of the wedges 32, 94, respectively. As previously noted, counter-rotation of the transmit wedge pair produces a horizontal scan. In particular, assuming that the wedges 30, 32 are initially aligned so that the modulated light beam from the laser diode 18 is directed at a spot or area at the left end or edge of the field of view 12, the counter-rotation of the wedges 30, 32, results in a horizontal movement of the light beam from the left end towards the right end of the field of view. After a 180° counter-rotation of the wedges 30, 32, the light beam has moved to and is positioned at the right end or edge of the field of view. At this position, the horizontal scan in one direction has been completed. The end of a horizontal scan is detected by means of the sensor assembly 130, namely, by means of the timing slit 132 being aligned with one of the two sensor devices 134, 136. The end of a horizontal scan triggers an incremental change in the position of the elevation mirror 34. This is accomplished by temporarily turning on the mirror motor 76 to cause the shaft 78 to pivot or rotate. The counter 80 in the servo assembly 74 is also incremented or updated to reflect the new position of the elevation mirror 34.

The wedges 30, 32 continue to rotate in opposite directions. Upon the completion of another 180° of counter-rotation, the light beam returns to the left end of the field of view 12, but along a different horizontal path due to the incremental movement of the elevation mirror 34. The end of the horizontal scan at the left end is sensed by the sensor assembly 130. The timing slit 132 now passes under or is aligned with the other of the two sensor devices 134, 136. Once again the elevation mirror 34 is incrementally changed in position so that the next horizontal path can be scanned by the light beam, with the next horizontal path being incrementally, vertically spaced from the previous horizontal path. Again, the counter 80 of the servo assembly 74 is incremented to reflect the new change in position of the elevation mirror 34. An entire raster scan of the field of view 12 is achieved using the transmit wedge pair as they continue to counter-rotate while the elevation mirror 34 incrementally changes in position each time an end of horizontal scan is completed. The end of a complete raster scan is detected by monitoring the position of the elevation mirror 34. Since the counter 80 of the servo assembly 74 keeps track of the position of the elevation mirror 34 by updating its count, once the counter 80 reaches a predetermined count, it is known that the elevation mirror 34 has completed its pivotal movement or rotation in one vertical direction. With the completion of the scan in the one vertical direction, the mirror motor 76 is activated to rapidly pivot the elevation mirror 34 back to an initial starting position. In the preferred embodiment, the vertical change in the raster scan is accomplished by causing the light beam to move downwardly. There is no raster scanning during the time that the elevation mirror is being adjusted upwardly in order to return it to its starting position.

At the same time the transmitter section 10 is directing a light beam to raster scan the field of view 12, the receiver section 14 is receiving reflected light from objects found in the field of view 12. Because of the cooperative arrangement between the transmitter elements and the receiver elements, particularly the counter-rotating wedges 30, 32 and 92, 94, a correspondence between the transmitted and reflected light can be achieved for incrementally changed positions of the light beam in the field of view 12. Upon passing through the wedges 92, 94 and the receive lens system 82, the returned light is directed and filtered by the relay optics for receipt by the photodetector 104.

With regard to providing a three-dimensional display of the field of view 12, the electrical signal output from the photodetector 104 is applied to phase detector electronics 140. The phase detector electronics 140 determines the distance or range for each pixel that defines the raster scan taken of the field of view 12. As previously noted, a pixel is defined for each 0.2° change in the horizontal scan. Consequently, any object in the field of view 12 that reflects light, which is returned to the transceiver, can be represented by a number of pixels, each pixel having a distance magnitude associated with it and the distance being from the transceiver to the object portion represented by the pixel. The output of the phase detector electronics 140 is applied to an analog/digital assembly 142 for converting the analog signals outputted by the phase detector electronics 140 to digital information that will be used to display a visual representation of the field of view 12 using the visual display 16. In that regard, the digital output from the analog/digital assembly 142 is sent to an I/O circuit assembly 144. This assembly includes memory for storing digital data containing three-dimensional information of the field of view 12 being scanned. In the preferred embodiment, the I/O circuit assembly 144 stores one complete horizontal scan, comprising 256 pixels, before the visual display 16 is changed to reflect the updated horizontal scan. The digital data sent to the visual display 16 is used to provide a graphics display illustrating objects, including intruders, found in the field of view. In the preferred embodiment, the relative distance of an object from the transceiver is illustrated by means of a color code by which objects relatively closer to the transceiver are seen as having a darker shade than objects that are more remote from the transceiver.

Based on the foregoing detailed description, a number of salient features of the present invention are immediately recognized. A transmitter/receiver apparatus is provided that can be readily integrated with additional hardware for displaying three-dimensional images of an area or a field being viewed by the apparatus. The transceiver can be used at any time of day to display images and, therefore, has significant application in the monitoring and detecting of intruders even during the night. The transmitter/receiver is uniquely characterized by its compact configuration that still permits the user to obtain a wide field of view and yet can be moved or mounted to a movable vehicle in order to change the scene being viewed by the apparatus. In addition, the gear arrangement of the present invention enables the raster scanning to be accomplished at a very rapid rate while reducing the amount of power required to operate the apparatus. Lastly, the transmitter/receiver of the present invention, together with the accompanying processing hardware, provide highly accurate and finely resolved three-dimensional images of the field being viewed so that the user can readily distinguish among different objects that might be observed on a visual display of the viewed field.

Although the present invention has been described with reference to a particular embodiment, it should be appreciated that variations and modifications can effected within the spirit and scope of this invention.

What is claimed is:

1. A transmitter/receiver apparatus for use in providing a three-dimensional display of a field of view, comprising:
    a light source;
    a lens system for use in collimating light from said light source;
    a transmit pair of counter-rotating wedges communicating with said lens system for directing said light in a first direction;
    transmit holder means for supporting said pair of transmit counter-rotating wedges;
    transmit secondary gear means including at least a first transmit secondary gear, said first transmit secondary gear operatively engaging said transmit holder means;
    a receive pair of counter-rotating wedges;
    receive holder means for supporting said pair of receive counter-rotating wedges;
    receive secondary gear means including at least a first receive secondary gear, said first receive secondary gear operatively engaging said receive holder means;
    primary gear means including at least a first primary gear, said first primary gear operatively engaging each of said first transmit secondary gear and said first receive secondary gear;
    vertical scanning means communicating with said light for directing said light in a second direction; and
    a housing including outer walls and a casing, said casing being contained within said outer walls and providing support for said pairs of counter-rotating wedges, said lens system, said vertical scanning means, said primary gear means, and said transmit and receive secondary gear means.

2. An apparatus, as claimed in claim 1, wherein:
    said first transmit secondary gear and said first receive secondary gear lie in substantially the same plane.

3. An apparatus, as claimed in claim 1, wherein:
    said primary gear means includes a second primary gear being driven at substantially the same speed as said first primary gear.

4. An apparatus, as claimed in claim 3, wherein:
    an axis of rotation of said first primary gear is aligned with an axis of rotation of said second primary gear.

5. An apparatus, as claimed in claim 1, wherein:
    said transmit secondary gear means includes a second transmit secondary gear, said first and second transmit secondary gears having aligned axes of rotation.

6. An apparatus, as claimed in claim 1, wherein:
    said receive secondary gear means includes a second receive secondary gear, said first and second receive secondary gears having aligned axes of rotation.

7. An apparatus, as claimed in claim 1, wherein:
    the axis of rotation of said first transmit secondary gear and the axis of rotation of said first receive secondary gear being located substantially the same distance from the axis of rotation of said first primary gear.

8. An apparatus, as claimed in claim 1, wherein:
    said vertical scanning means includes mirror means pivotable about a substantially horizontal axis.

9. An apparatus, as claimed in claim 8, wherein:
    said mirror means extends between said transmit and receive counter-rotating wedges and is supported on an outer surface of said casing.

10. An apparatus, as claimed in claim 8, wherein:
    said vertical scanning means further includes motor means connected to said mirror means, said motor means including means for use in determining the position of said mirror means.

11. An apparatus, as claimed in claim 1, wherein:
    said receive secondary gear means includes a timing slit and sensing means for use in determining when a scan is completed in said first direction.

12. An apparatus, as claimed in claim 11, wherein:
    said timing slit is formed in a surface of said receive secondary means which is adjacent to said vertical scanning means.

13. An apparatus, as claimed in claim 11, wherein:
    said sensing means includes a first sensor device and a second sensor device spaced 180° from said first sensor device.

14. An apparatus, as claimed in claim 8, wherein:
    said vertical scanning means includes control means for causing movement of said mirror means at the completion of a scan in said first direction.

15. An apparatus, as claimed in claim 14, wherein:
    said control means includes counter means having a predetermined count corresponding to a reference location for said mirror means from which said scan in a second direction begins.

16. An apparatus, as claimed in claim 1, further including:
    means, communicating with said receive counter-rotating wedges, for directing light at an angle away from one portion of said housing towards another portion of said housing.

17. An apparatus, as claimed in claim 16, wherein:
    said means for directing includes a mirror.

18. An apparatus, as claimed in claim 16, wherein:
    said means for directing includes light filter means comprising a plate having an aperture.

19. An apparatus, as claimed in claim 1, further including:
    means for converting light energy to electrical energy.

20. An apparatus, as claimed in claim 1, wherein:
    said holder means includes at least a first holder having slot means and bearing means located outwardly of said first holder between said first holder and an outer surface of said casing, said slot means for receiving portions of one of said transmit counter-rotating wedges.

21. An apparatus, as claimed in claim 20, wherein:
    said holder means includes a second holder aligned with said first holder.

22. A method for transmitting and receiving light for use in providing a three-dimensional visual display of a field of view, comprising:
    supplying modulated light;
    collimating said light;
    providing first and second transmit optical wedges;
    providing first and second receive optical wedges;
    providing first and second primary gears;
    providing first and second transmit secondary gears;
    providing first and second receive secondary gears;

engaging said first primary gear with both of said first transmit secondary gear and said first receive secondary gear;
engaging said second primary gear with both of said second transmit secondary gear and said second receive secondary gear;
counter-rotating said first and second transmit optical wedges using said first primary gear and said first transmit secondary gear and using said second primary gear and said second transmit secondary gear;
passing said light through said counter-rotating first and second transmit wedges;
scanning a desired area using said light;
receiving reflected light;
counter-rotating said first and second receive wedges using said first primary gear and said first receive secondary gear and using said second primary gear and said second receive secondary gear; and
receiving said light through said counter-rotating receive wedges.

23. A method, as claimed in claim 22, wherein:
said scanning includes moving mirror means in incremental steps at a first speed in one direction from a reference location during scanning and moving said mirror means at a second speed, greater than said first speed, between scans.

24. A method, as claimed in claim 22, wherein:
said providing of said primary gears and said providing of said secondary gears includes locating said first primary gear, said first transmit secondary gear, and said first receive secondary gear in substantially the same plane.

25. A method, as claimed in claim 24, wherein:
said providing of said primary gears and said providing of said secondary gears includes locating said second primary gear, said second transmit secondary gear, and said second receive secondary gear in substantially the same plane.

26. A method, as claimed in claim 22, wherein:
said scanning includes determining when a horizontal scan is completed using a timing slit formed in one of said secondary gears.

27. A method, as claimed in claim 22, wherein:
said engaging of said first primary gear with said first transmit and receive secondary gears includes symmetrically positioning said first transmit secondary gear and said first receive secondary gear relative to said first primary gear.

28. A method, as claimed in claim 22, wherein:
said providing of said secondary gears includes aligning the axes of rotation of said first and second transmit secondary gears and aligning the axes of rotation of said first and second receive secondary gears.

29. A method, as claimed in claim 22, wherein:
said counter-rotating of said transmit wedges includes providing a holder for supporting said first transmit wedge and engaging said holder with said first transmit secondary gear.

* * * * *